(12) United States Patent
Lee et al.

(10) Patent No.: US 7,459,814 B2
(45) Date of Patent: Dec. 2, 2008

(54) HYBRID INDUCTION MOTOR

(75) Inventors: Dong-Il Lee, Bucheon (KR); Seung-Do Han, Incheon (KR); Hyoun-Jeong Shin, Incheon (KR); Jae-Hong Ahn, Anyang (KR); Seung-Suk Oh, Gwangmyeong (KR)

(73) Assignee: LG Electronics Inc., Seoul (KR)

( * ) Notice: Subject to any disclaimer, the term of this patent is extended or adjusted under 35 U.S.C. 154(b) by 525 days.

(21) Appl. No.: 11/325,503

(22) Filed: Jan. 5, 2006

(65) Prior Publication Data

US 2006/0208597 A1    Sep. 21, 2006

(30) Foreign Application Priority Data

Mar. 15, 2005    (KR) .................... 10-2005-0021567

(51) Int. Cl.
 H02K 7/10   (2006.01)
 H02K 16/02  (2006.01)
 H02K 17/16  (2006.01)
 H02K 17/30  (2006.01)

(52) U.S. Cl. ............... 310/77; 310/68 R; 310/114; 310/156.78; 310/166; 310/211; 318/727; 361/23

(58) Field of Classification Search ............ 310/77, 310/68 R, 68 B, 114, 41, 156.78, 156.81, 310/166, 167, 211; 361/23; 318/727
See application file for complete search history.

(56) References Cited

U.S. PATENT DOCUMENTS

| | | | | |
|---|---|---|---|---|
| 3,501,656 A | * | 3/1970 | Morley | 310/41 |
| 3,821,567 A | * | 6/1974 | Erwin | 310/41 |
| 4,177,395 A | * | 12/1979 | Hore | 310/39 |
| 4,651,040 A | * | 3/1987 | Gerstner et al. | 310/166 |
| 5,117,143 A | | 5/1992 | Iddings | |
| 2004/0174083 A1 | | 9/2004 | Han et al. | |

FOREIGN PATENT DOCUMENTS

| | | |
|---|---|---|
| EP | 1455435 | 9/2004 |
| JP | 60-190141 | 9/1985 |

OTHER PUBLICATIONS

U.S. Appl. No. 11/325,301 to Kim et al., filed Jan. 5, 2006.
U.S. Appl. No. 11/275,257 to Han et al., filed Dec. 21, 2005.
English Language Abstract of JP 60-190141.

* cited by examiner

*Primary Examiner*—Burton Mullins
(74) *Attorney, Agent, or Firm*—Greenblum & Bernstein, P.L.C.

(57) ABSTRACT

The hybrid induction motor includes a housing; a stator installed in the housing and having a stator core portion and a stator coil portion; a rotor coupling body having a rotary shaft rotatably installed in at the housing, a cage rotor portion rotating integrally with the rotary shaft, and a permanent magnet rotor portion coupled to a circumference of the cage rotor portion with a certain air gap so as to rotate freely with respect to the rotary shaft; and a reverse rotation preventing switch, when the rotary shaft rotates reversibly, coming in contact with the permanent magnet rotor portion which is moved along the shaft by thrust generated by the rotor coupling body and cutting off power being supplied to the stator coil portion.

13 Claims, 7 Drawing Sheets

HYBRID INDUCTION MOTOR

CROSS REFERENCE TO RELATED APPLICATIONS

The present disclosure relates to subject matter contained in priority Korean Patent Application No. 21567/2005, filed on Mar. 15, 2005, which is herein expressly incorporated by reference in its entirety.

BACKGROUND OF THE INVENTION

1. Field of the Invention

The present invention relates to a hybrid induction motor, and more particularly, to a hybrid induction motor having a reverse rotation preventing function.

2. Description of the Background Art

In general, an induction motor includes a stator forming a rotating magnetic field and a rotor unit rotatably disposed from the stator with an air gap therebetween. Recently, the so-called hybrid induction motor, which has a permanent magnet interposed between the stator and the rotor unit, has been widely used so as to enhance operational efficiency and reduce power consumption.

FIG. 1 is a cross-sectional view of a conventional hybrid induction motor, and FIG. 2 is a cross-sectional view of a cage rotor portion taken along line II-II of FIG. 1. With reference to FIG. 1, the hybrid induction motor of the prior art includes: a housing 151, a cover 155, a stator 110 and a rotor coupling body 120 rotatably received in the stator 110.

The housing 151 is a container having an opening at its front side, and the cover 155 for covering the opening is coupled with the front side of the housing 151.

Bearing receiving portions 153 and 157 capable of receiving bearings 125, respectively, are formed at a rear side of the housing 151 and a center portion of the front side of the cover 155.

The stator 110 includes a stator core portion 111 and a stator coil portion 115.

The stator core portion 111 is formed by insulating/laminating a plurality of electric steel sheets, each having a rotor receiving hole 112 and a slot 113 formed thereon.

The stator coil portion 115 winds around the stator core portion 111 and generates a rotating magnetic field.

The rotor coupling body 120 includes a rotary shaft 121, a cage rotor portion 131 integrally coupled to a circumference of the rotary shaft 121 so as to be rotatable, and a permanent magnet rotor portion 141 coupled to a circumference of the cage rotor portion 131 with a certain air gap so as to be rotatable with respect to the rotary shaft 121.

The bearings 125 are insertedly installed in the bearing receiving portions 153 and 157, respectively, and support the rotary shaft 121 so as to be rotatable. A fan 150 is coupled to a front end of the rotary shaft 121.

The permanent magnet rotor portion 141 includes a permanent magnet 142, and a magnet support portion 144 having one side coupled with the rotary shaft 121 so as to support the permanent magnet 142 to be rotatable and the other side integrally coupled with the permanent magnet 142.

With reference to FIGS. 1 and 2, the cage rotor portion 131 includes: a rotor core portion 133 formed by insulating/laminating electric steel plates, each having a shaft hole 134 at its center and a plurality of slots 135 along a circumferential direction; a conductor bar 137 disposed inside each slot 135; and an end ring portion 139 formed to electrically connect both ends of the conductor bar 137 to each other.

Hereinafter, the operation of the conventional hybrid induction motor illustrated in FIGS. 1 and 2 will be described.

A rotating magnetic field is formed if power is supplied to the stator 110.

The permanent magnet rotor portion 141 performs relative rotation to the rotary shaft 121 so as to correspond to the rotating magnetic field and is synchronized.

An induced current flows through each conductor bar 137 of the cage rotor portion 131 by a magnetic force of the permanent magnet rotor portion 141, and accordingly the cage rotor portion 131 is rotated integrally with the rotary shaft 121.

However, the conventional hybrid induction motor has a problem that the permanent magnet rotor portion 141 and the cage rotor portion 131 rotate reversibly because of a voltage phase at the first power input, an influence of an unbalanced rotating magnetic field and initial polarity of a magnet or the like.

Accordingly, in order to prevent such reverse rotation, the conventional hybrid induction motor requires a separate reverse rotation detecting and blocking circuit (not illustrated), which thusly increases the manufacturing cost.

SUMMARY OF THE INVENTION

Therefore, an object of the present invention is to provide a hybrid induction motor implementing low manufacturing cost and capable of preventing reverse rotation.

To achieve these and other advantages and in accordance with the purpose of the present invention, as embodied and broadly described herein, there is provided a hybrid induction motor including a housing; a stator installed in the housing and having a stator core portion and a stator coil portion; a rotor coupling body having a rotary shaft rotatably installed at the housing, a cage rotor portion rotating integrally with the rotary shaft, and a permanent magnet rotor portion coupled to a circumference of the cage rotor portion with a certain air gap so as to be freely rotatable with respect to the rotary shaft; and a reverse rotation preventing switch, when the rotary shaft rotates reversibly, coming in contact with the permanent magnet rotor portion which is moved along the shaft by thrust generated by the rotor coupling body and cutting off power being supplied to the stator coil portion. In a further aspect of the present invention, the conductor bar is inclined downwardly toward a side of the cage rotor portion adjacent the magnet support portion to have a skew angle with respect to the rotary shaft and the reverse rotation preventing switch is positioned at the side of the cage rotor portion adjacent the magnet support portion of the inside of the housing. Further, in an aspect of the present invention, the conductor bar is inclined downwardly away from a side of the cage rotor portion adjacent the magnet support portion to have a skew angle with respect to the rotary shaft and the reverse rotation preventing switch is positioned at the side of the cage rotor portion opposite the magnet support portion of the inside of the housing.

The accompanying drawings, which are included to provide a further understanding of the invention and are incorporated in and constitute a part of this specification, illustrate embodiments of the invention and together with the description serve to explain the principles of the invention.

BRIEF DESCRIPTION OF THE DRAWINGS

The foregoing and other objects, features, aspects and advantages of the present invention will become more apparent from the following detailed description of the present invention when taken in conjunction with the accompanying drawings, in which.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention, the description is taken with the drawings making apparent to those skilled in the art how the forms of the present invention may be embodied in practice.

Figure 1:
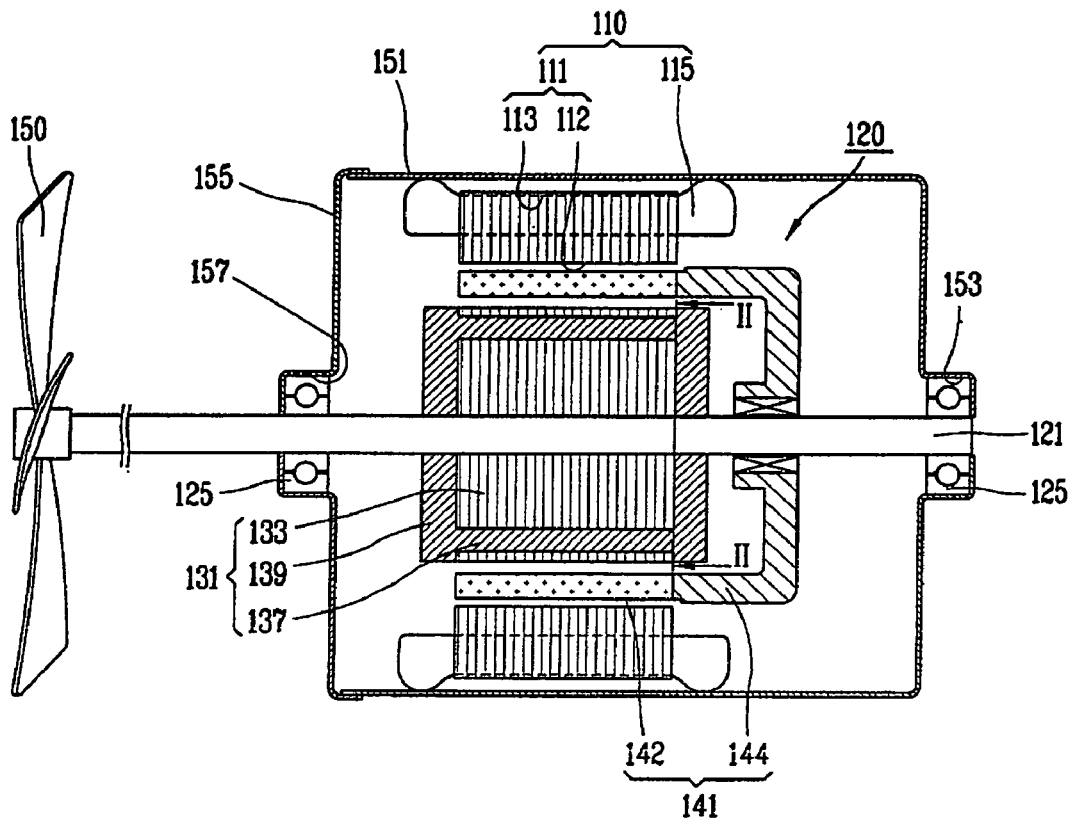
FIG. 1 is a cross-sectional view of a conventional hybrid induction motor.
Figure 2:
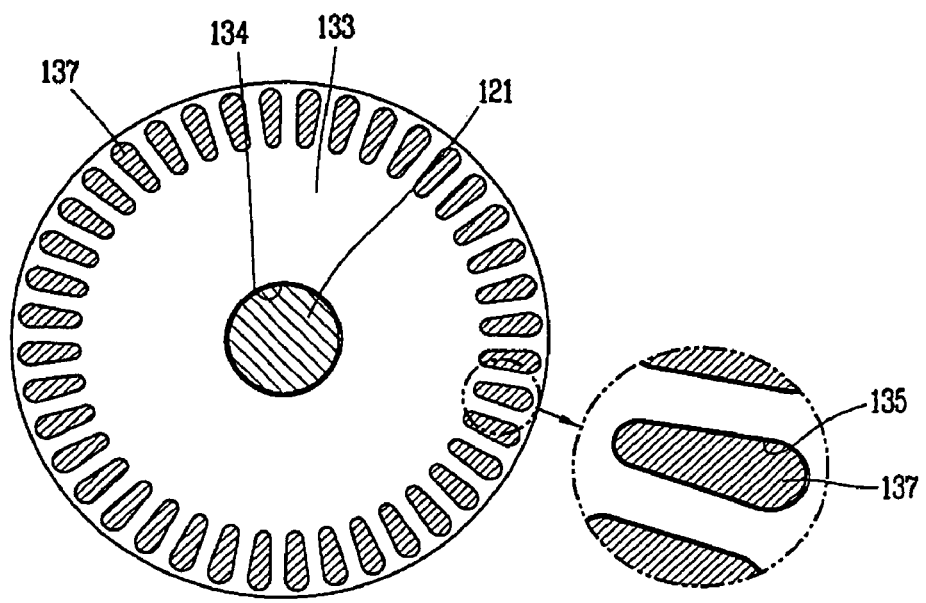
FIG. 2 is a front view of a cage rotor portion taken along line II-II of FIG. 1.
Figure 3:
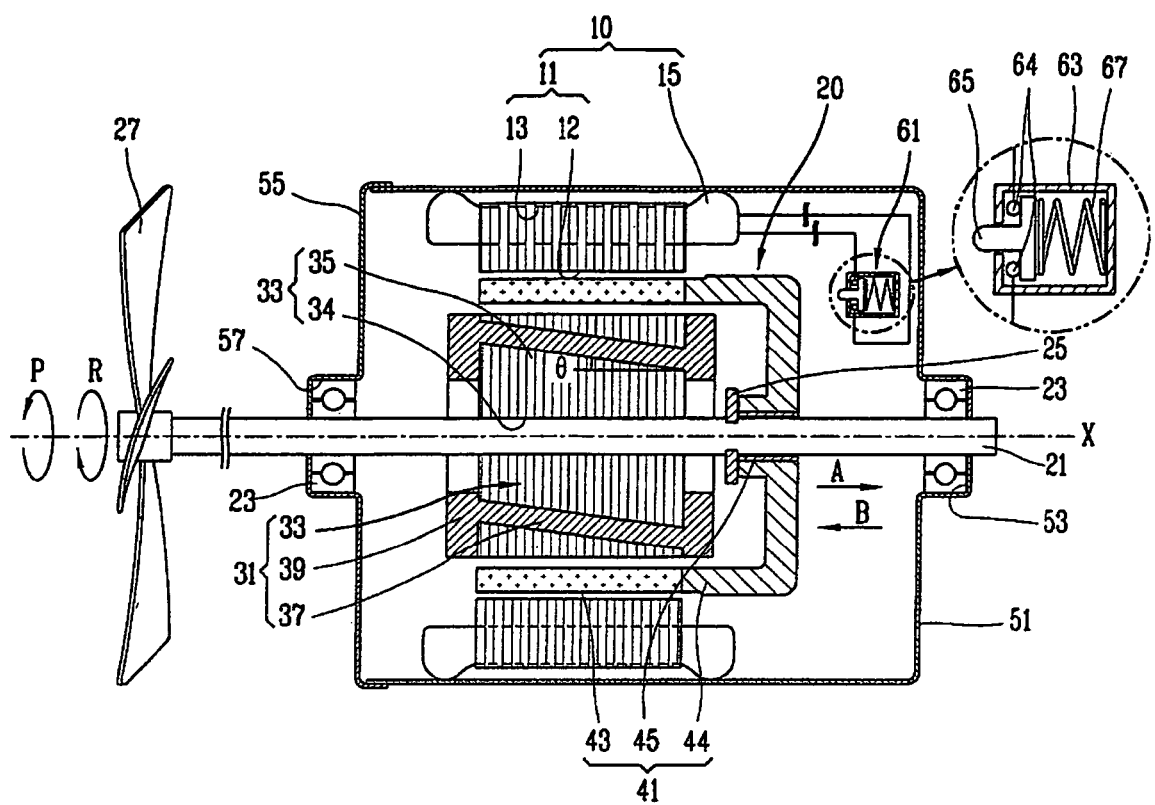
FIG. 3 is a cross-sectional view of a hybrid induction motor in accordance with a first embodiment of the present invention.
Figure 4:
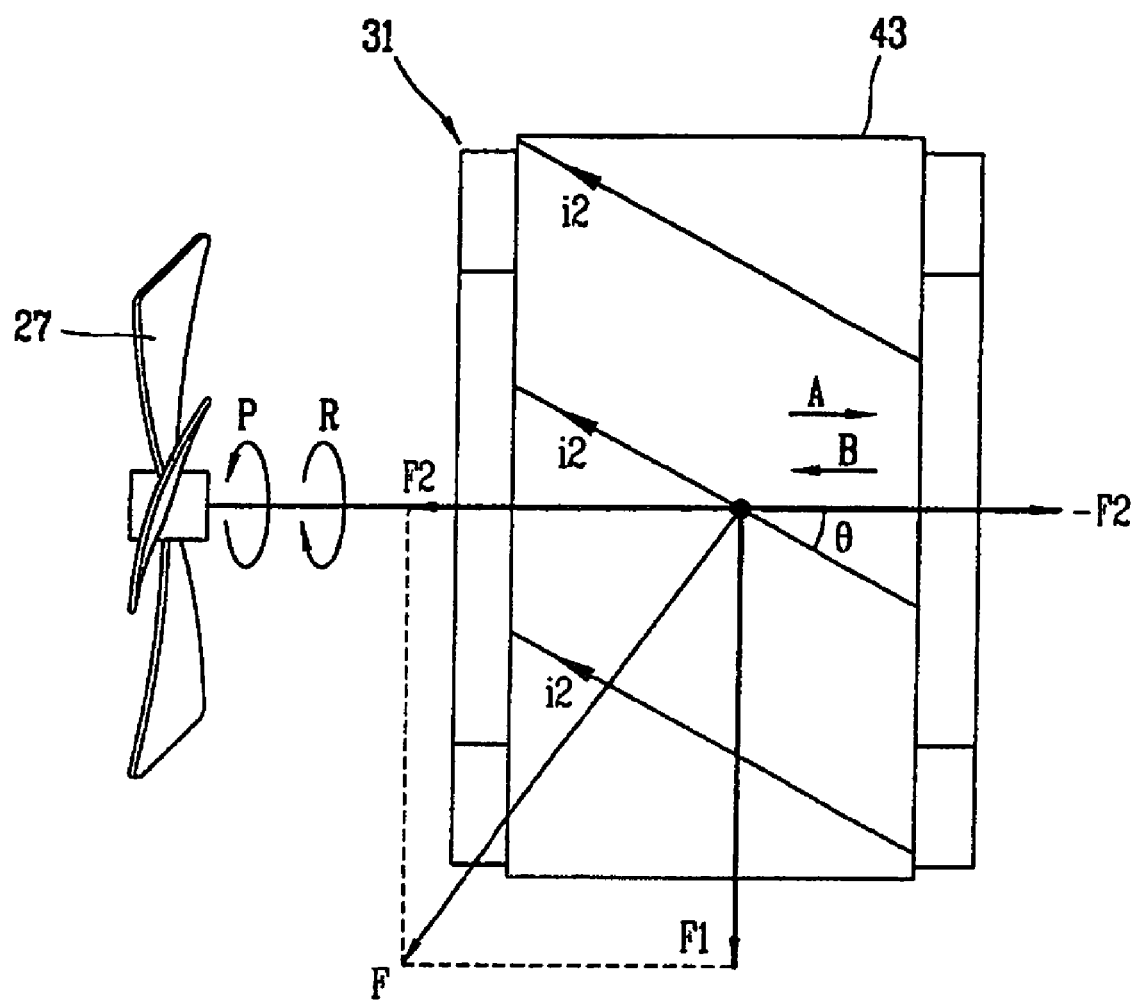
FIG. 4 is a side view illustrating the thrust operation during reverse rotation of a rotary shaft of FIG. 3.
Figure 5:
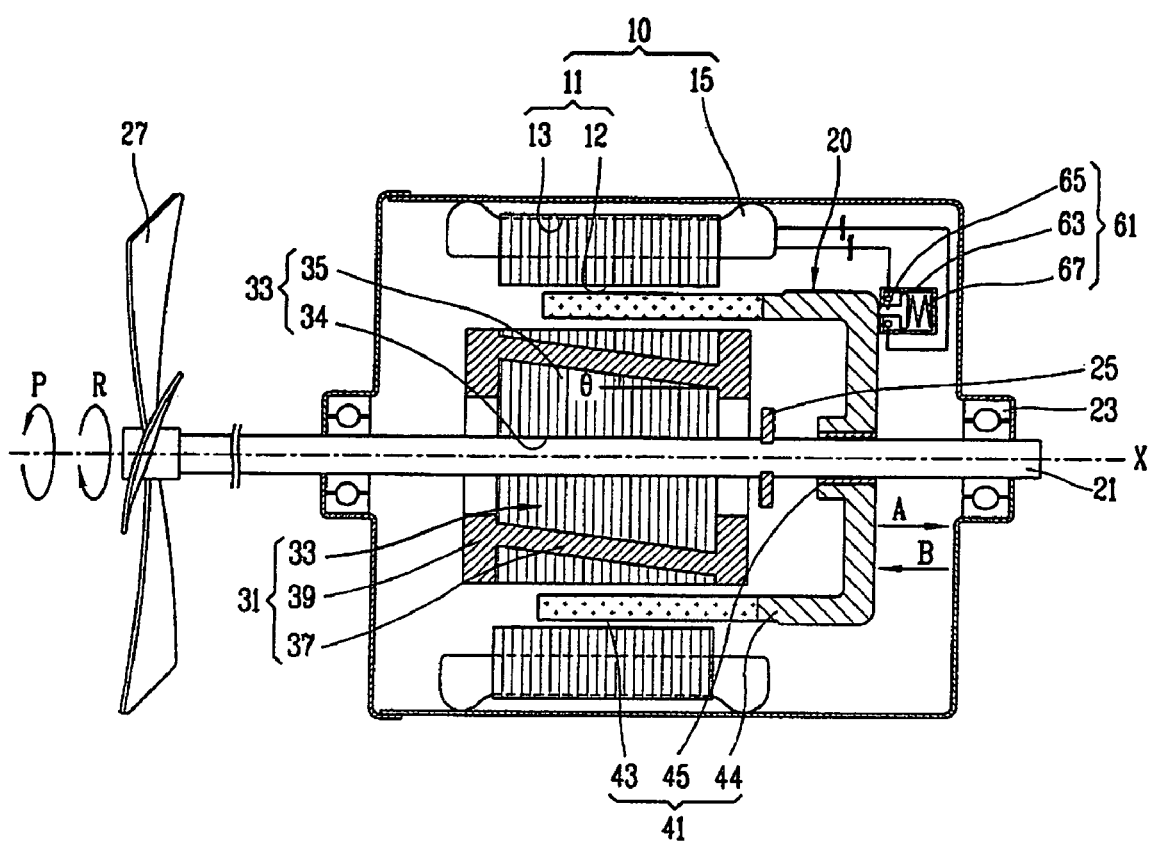
FIG. 5 is a cross-sectional view illustrating the operation of a reverse rotation preventing switch of FIG. 3.

Reference will now be made in detail to a hybrid induction motor in accordance with a first embodiment of the present invention, examples of which are illustrated in the accompanying drawings. FIG. 3 is a cross-sectional view of a hybrid induction motor in accordance with a first embodiment of the present invention; FIG. 4 is a side view illustrating the thrust operation during reverse rotation of a rotary shaft; and FIG. 5 is a cross-sectional view illustrating the operation of a reverse rotation preventing switch of FIG. 3.

With reference to FIGS. 3 and 4, a hybrid induction motor in accordance with the first embodiment includes a housing 51, a stator 10, a rotor coupling body 31 and a reverse rotation preventing switch 61.

The housing 51 is a container having an opening at its front side, and a cover 55 for covering the opening is coupled to the front side. Bearing receiving portions 53 and 57 capable of receiving bearings 23, respectively, are formed at a rear side of the housing 51 and the center portion of a front side of the cover 55, respectively.

The stator 10 includes a stator core portion 11 and a stator coil portion 15. The stator core portion 11 is formed by insulating/laminating a plurality of electric steel plates, each of which has a rotor receiving hole 12 and a slot 13. The stator coil portion 15 winds around the stator core portion 11 and generates a rotating magnetic field.

The rotor coupling body 20 includes a rotary shaft 21, a cage rotor portion 31 and a permanent magnet rotor portion 41.

A fan 27 rotating integrally with the rotary shaft 21 is coupled to a front end portion of the rotary shaft 21. The bearings 23 are insertedly installed in the bearing receiving portions 53 and 57, respectively, and support the rotary shaft 21 so as to be rotatable.

The cage rotor portion 31 is coupled with the rotary shaft 21 so as to be rotatable integrally with the rotary shaft 21, and includes a rotor core 33, a conductor bar 37 and an end ring portion 39.

The rotor core 33 includes a plurality of slots 35 each of which has a shaft hole 34 into which the rotary shaft 21 is inserted at its center and which are disposed separately from each other.

The conductor bar 37 penetrates the rotor core 33. A plurality of conductor bars 37 are inclined downwardly toward the right from the left to have a skew angle as much as $\ominus$ with respect to the rotary shaft 21. The conductor bar 37 has the skew angle as much as $\ominus$ with respect to the rotary shaft 21 to thereby generate a reaction force (−F2) to allow the permanent magnet rotor portion 41 to move in a direction of the arrow A along a direction of an axis (X).

This will be described in more detail as follows.

If an unbalanced rotating magnetic field or the like causes reverse rotation of the rotary shaft 21 in a direction of the arrow R, torque (F) is generated in a direction perpendicular to the skew angle of the conductor bar 37. The torque (F) can be separated into torque (F1) rotating the cage rotor portion 31 and thrust (F2) moving the cage rotor portion 31 in a direction of the arrow B along direction of the axis (X).

The cage rotor portion 31 is integrally fixed and coupled with the rotary shaft 21, and the permanent magnet rotor portion 41 is movably coupled with the rotary shaft 21 along the direction of the axis (X). Accordingly, the thrust (F2) acts as the reaction force (−F2) by which the permanent magnet rotor portion 41 performs relative movement along the direction of the axis (X). That is, while the cage rotor portion 31 is fixed, only the permanent magnet rotor portion 41 is moved in the direction of the arrow A, that is, in a direction in which the magnet rotor portion 41 moves farther away from the cage rotor portion 31.

With reference to FIG. 3, the end ring portion 39 connects both ends of the conductor bar 37 to each other. The end ring portion 39 may be connected to the conductor bar 37 by any suitable device and in the present embodiment, the end ring portion 39 and the conductor bar 37 are formed integrally and in one piece by a die casting.

The permanent magnet rotor portion 41 is coupled to a circumference of the cage rotor portion 31 with a certain or predetermined air gap so as to be freely rotatable with respect to the rotary shaft 21, and includes a permanent magnet 43, a bearing 45 and a magnet support portion 44.

The permanent magnet 43 has a cylindrical shape, forms magnet poles different from each other along a circumferential direction, and is coupled to one side of the magnet support portion 44.

The bearing 45 is coupled with the rotary shaft 21 so as to be freely rotatable with respect to the rotary shaft 21 and movable in the direction of the arrow A or the arrow B along the direction of the axis (X).

The magnet support portion 44 has one side integrally coupled with the bearing 45 and the other side supporting the permanent magnet 142 so as to be rotatable.

A stopper 25 is installed at the inside of the permanent magnet rotor portion 41. The stopper 25, when the rotary shaft 21 rotates forward in a direction of the arrow P, prevents the permanent magnet rotor portion 41 from moving in the direction of the arrow B along the direction of the axis (X) of the rotary shaft 21 more than a certain distance.

The reverse rotation preventing switch 61 is installed at the right side (as shown in FIG. 3) of the inside of the housing 51, and includes a body 63, an operation pin 65 and a spring 67. The reverse rotation preventing switch 61, when the rotary shaft 21 rotates reversibly in a direction of the arrow R, comes in contact with the permanent magnet rotor portion 41 and cuts off power being supplied to the stator coil portion 15 (refer to FIG. 5).

The body 63 forms a receiving space therein. The operation pin 65 connects or separates a point of contact 64 by projecting or retracting with respect to the body 63, whereby power is supplied or cut off to the stator coil portion 15. The spring 67 is installed at the rear side of the operation pin 65, and pressurizes the operation pin 65 to project the operation pin 65 outside the body 63.

Hereinafter, the operation of the hybrid induction motor in accordance with the first embodiment illustrated in FIGS. 3 to 5 will be described.

With reference to FIGS. 3 and 4, when the unbalanced rotating magnetic field causes reverse rotation of the rotary shaft 21 in the direction of the arrow R, an induced current i2 flows through the conductor bar 37 to thereby generate torque (F) in a direction perpendicular to the skew angle of the conductor bar 37.

The torque (F) can be separated into torque (F1) rotating the cage rotor portion 31 and thrust (F2) allowing the cage rotor portion 31 to move in the direction of the arrow B along the direction of the axis (X).

The cage rotor portion 31 is integrally fixed and coupled with the rotary shaft 21, and the permanent magnet rotor portion 41 is coupled so as to be movable with respect to the rotary shaft 21 along the direction of the axis (X). Accordingly, the thrust (F2) acts as a reaction force (−F2) by which the permanent magnet rotor portion 41 is moved in the direction of the arrow A along the direction of the axis (X). That is, while the cage rotor portion 31 is fixed, only the permanent magnet rotor portion 41 is moved in the direction of the arrow A, that is, in the direction in which the magnet rotor portion 41 moves away from the cage rotor portion 31.

With reference to FIG. 5, one side of the moved permanent magnet rotor portion 41 pressurizes the operation pin 65 of the reverse rotation preventing switch 61. The pressurized operation pin 65 retracts inside the body 63 and separates the point of the contact 64, thereby cutting off power being supplied to the stator coil portion 15.

If the power is cut off, the reaction force (−F2) applied to the permanent magnet rotor portion 41 is released. Therefore, the permanent magnet rotor portion 41 is moved in the direction of the arrow B and returned to an initial position. In this case, the stopper 25 prevents the permanent magnet rotor portion 41 from moving in the direction of the arrow B along the direction of the axis (X) of the rotary shaft 21 more than a certain distance.

The reverse rotation preventing switch 61 is returned to the initial position by a restoring force of the spring 67. Here, the operation pin 65 projects outside the body 63, connects the point of contact 64 and therefore supplies power to the stator coil portion 15.

As processes by which the power is supplied and cut off to the stator coil portion 15 are repeated, the reverse rotation of the fan 27 in the direction of the arrow R of the rotary shaft 21 is prevented and forward rotation in the direction of the arrow P is possible.

Figure 6:
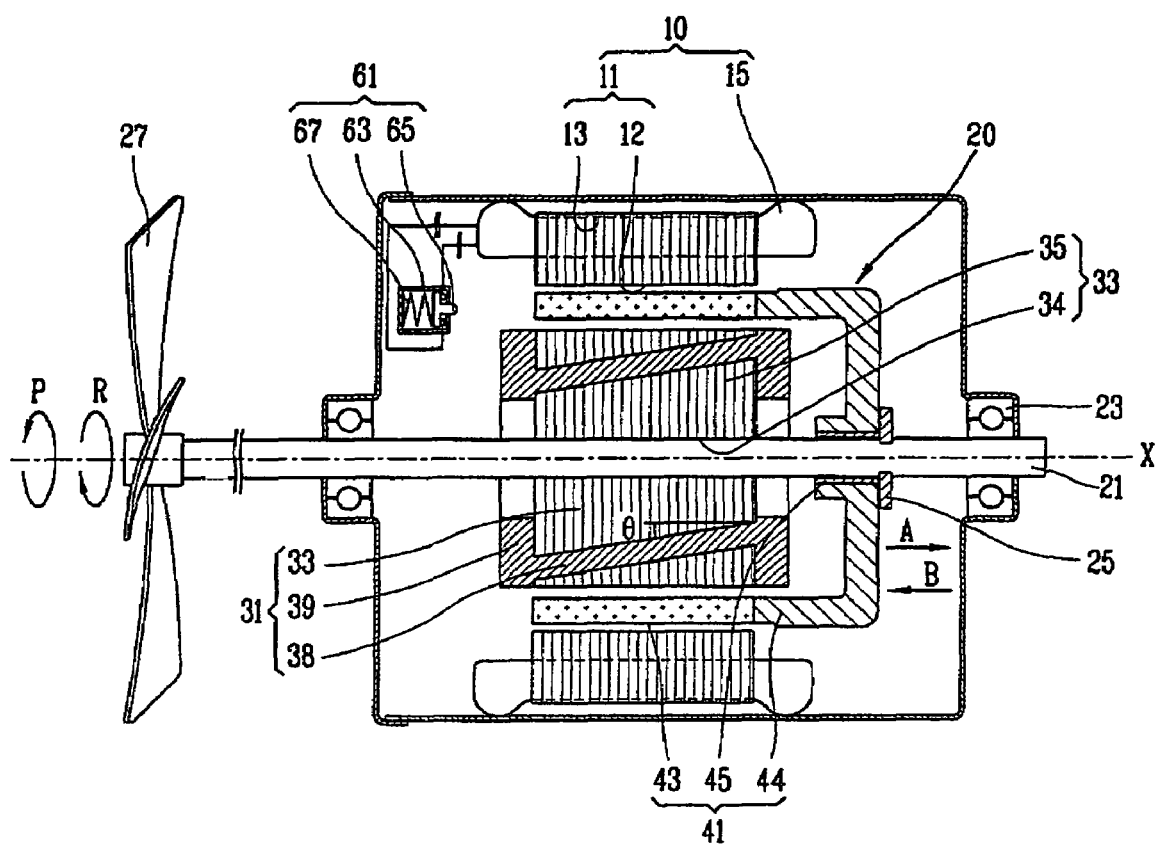
FIG. 6 is a cross-sectional view of a hybrid induction motor in accordance with a second embodiment of the present invention.
Figure 7:
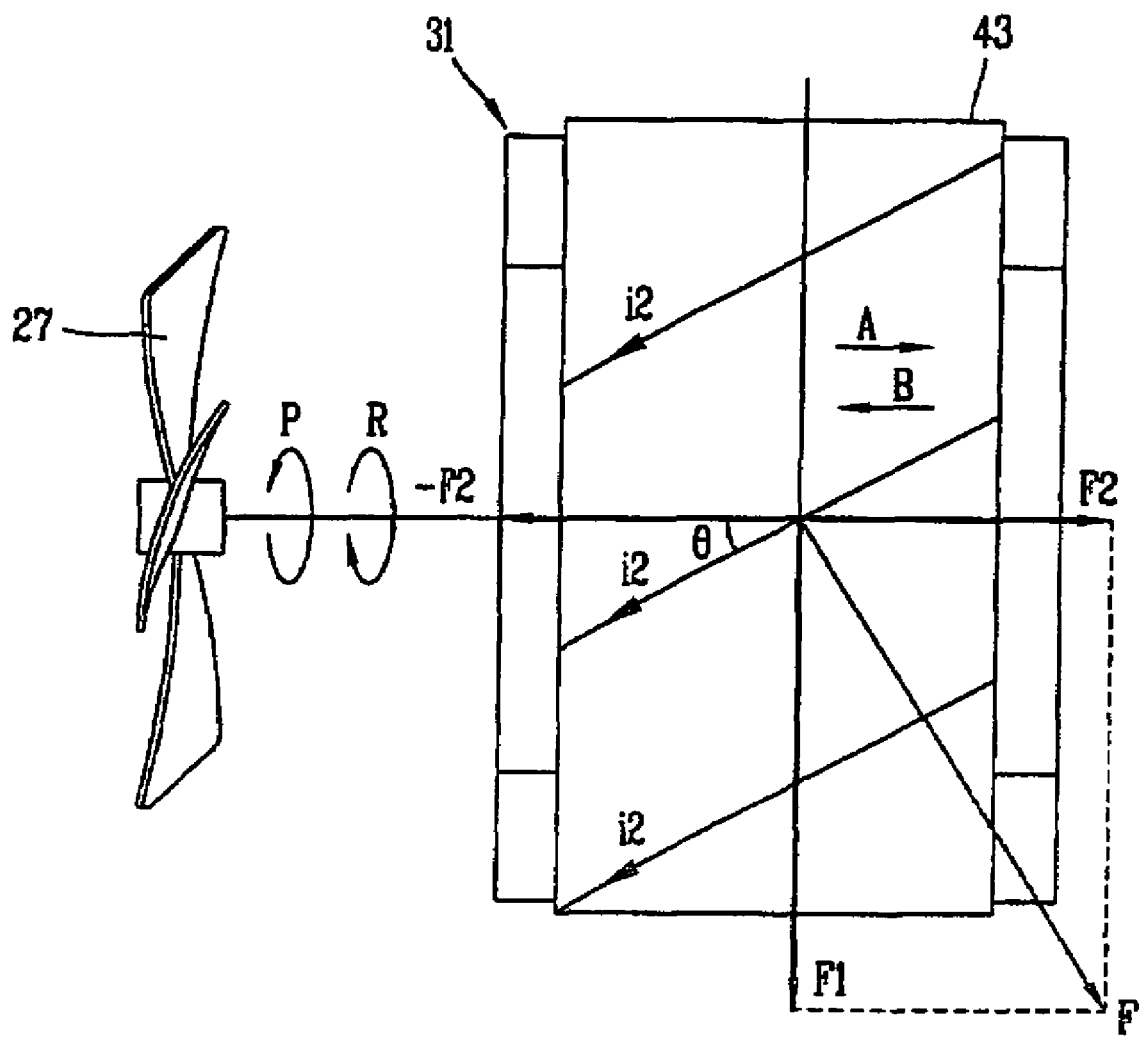
FIG. 7 is a side view illustrating the thrust operation during reverse rotation of a rotary shaft of FIG. 6.
Figure 8:
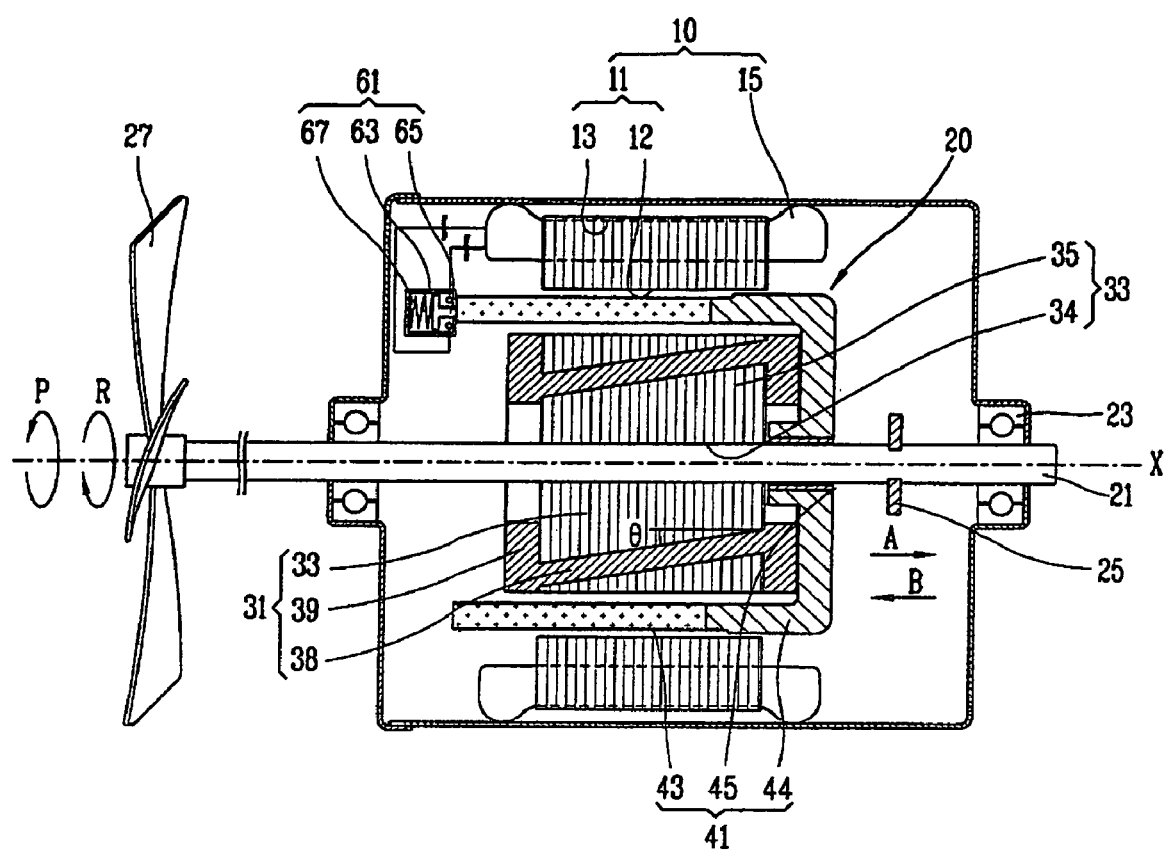
FIG. 8 is a cross-sectional view illustrating the operation of a reverse rotation preventing switch of FIG. 6.

Here, with reference to the accompanying drawings, a hybrid induction motor in accordance with a second embodiment of the present invention will described in detail. FIG. 6 is a sectional view of a hybrid induction motor in accordance with the second embodiment of the present invention, FIG. 7 is a view illustrating thrust operation during reverse rotation of a rotary shaft of FIG. 6, and FIG. 8 is a view illustrating the operation of a reverse rotation preventing switch of FIG. 6. The same reference numerals are given to the same construction as the aforementioned and illustrated construction for the purpose of simplicity in description for the drawings, and detailed descriptions therefor will be omitted.

A difference between the first embodiment and the second embodiment lies in a direction of a skew angle of a conductor bar 38, a location of a reverse rotation preventing switch 61 and a location of a stopper 25. Since the remaining construction is the same, a detailed description therefor will be omitted.

With reference to FIGS. 6 and 7, while the conductor bar 37 of the first embodiment is inclined downwardly toward the right side from the left side, the conductor bar 38 of the second embodiment is inclined downwardly toward the left side from the right side to have a skew angle as much as $\ominus$ with respect to a rotary shaft 21.

The conductor bar 38 has the skew angle as much as $\ominus$ with respect to the rotary shaft 21 to thereby generate a reaction force (−F2) by which the permanent magnet rotor portion 41 is moved in a direction of the arrow B along a direction of an axis (X).

This will be described in more detail as follows.

When an unbalanced rotating magnetic field or the like causes reverse rotation of the rotary shaft 21 in a direction of the arrow R, torque (F) is generated in a direction perpendicular to the skew angle of the conductor bar 38.

The torque (F) can be separated into torque (F1) rotating a cage rotor portion 31 and thrust (F2) allowing the cage rotor portion 31 to move in a direction of the arrow A along the direction of the axis (X).

The cage rotor portion 31 is integrally fixed and coupled with the rotary shaft 21, while the permanent magnet rotor potion 41 is coupled so as to be movable with respect to the rotary shaft 21 along the direction of the axis (X).

Accordingly, the thrust (F2) acts as the reaction force (−F2) by which the permanent magnet rotor portion 41 moves along the direction of the axis (X). That is, while the cage rotor portion 31 is fixed, only the permanent magnet rotor portion 41 is moved in the direction of the arrow B, that is, in a direction in which the permanent magnet rotor portion 41 moves away from the cage rotor portion 31.

While the stopper 25 of the first embodiment is installed at the inside of the permanent magnet rotor portion 41, the stopper 25 of the second embodiment is installed at the outside of the permanent magnet rotor portion 41. The stopper 25, when the rotary shaft 21 rotates forward in the direction of the arrow P, prevents the rotary shaft 21 from moving in the direction of the arrow A along the direction of the axis (X) of the rotary shaft 21 more than a certain distance.

While the reverse rotation preventing switch 61 is installed at the right side of the inside of the housing 51 in the first embodiment, a reverse rotation preventing switch 61 is installed at the left side of the inside of the housing 51 and includes a body 63, an operation pin 65 and a spring 67. The reverse rotation preventing switch 61, when the rotary shaft 21 rotates reversibly in the direction of the arrow R, comes in contact with the permanent magnet rotor portion 41 and cuts off power being supplied to the stator coil portion 15.

Hereinafter, the operation of the hybrid induction motor in accordance with the second embodiment illustrated in FIGS. 6 to 8 will be described.

With reference to FIGS. 6 and 7, when the unbalanced rotating magnetic field or the like causes reverse rotation of the rotary shaft 21 in the direction of the arrow R, an induced current i2 flows through the conductor bar 38 and torque (F) is generated in a direction perpendicular to the skew angle of the conductor bar 38.

The torque (F) can be separated into torque (F1) rotating the cage rotor portion 31 and thrust (F2) allowing the cage rotor potion 31 to move in the direction of the arrow A along the direction of the axis (X).

The cage rotor portion 31 is integrally fixed and coupled with the rotary shaft 21, and the permanent magnet rotor portion 41 is coupled so as to be movable with respect to the rotary shaft 21 along the direction of the axis (X). Accordingly, the thrust (F2) acts as a reaction force (−F2) by which the permanent magnet rotor portion 41 may to move in the direction of the arrow B along the direction of the axis (X). That is, while the cage rotor portion 31 is fixed, only the permanent magnet rotor portion 41 moves in the direction of the arrow B, that is, in the direction in which the permanent magnet rotor portion 41 moves toward the cage rotor portion 31.

With reference to FIG. 8, one side of the moved permanent magnet rotor portion 41 pressurizes the operation pin 65 of the reverse rotation preventing switch 61. The pressurized operation pin 65 retracts inside the body 63 and separates a point of contact 64, thereby cutting off power being supplied to the stator coil portion 15.

If the power is cut off, the reaction force (−F2) applied to the permanent magnet rotor potion 41 is released. Therefore, the permanent magnet rotor portion 41 is moved in the direction of the arrow A and returned to an initial position. In this case, the stopper 25 prevents the permanent magnet rotor portion 41 from moving in the direction of the arrow A along the direction of the axis (X) of the rotary shaft 21 more than a certain distance.

The reverse rotation preventing switch 61 is returned to its initial position by a restoring force of the spring 67. Here, the operation pin 65 projects outside the body 63 and connects the point of contact 64, thereby supplying power to the stator coil portion 15.

As the processes by which the power is supplied and cut off to the stator coil portion 15, the reverse rotation of the fan 27 and the rotary shaft 21 in the direction of the arrow R is prevented and forward rotation in the direction of the arrow P is possible.

In the above-described first and second embodiments, the conductor bars 37 and 38 have a skew angle as much as $\ominus$ with respect to the rotary shaft 21 in order to generate the reaction force (−F2) by which the permanent magnet rotor portion 41 moves along the direction of the axis (X). However, as occasion demands, the conductor bars 37 and 38 can be disposed at the rotary shaft 21 without the skew angle and each magnetic pole of the permanent magnet rotor portion 41 has a certain skew angle.

As described so far, according to the above-described hybrid induction motors in accordance with the embodiments of the present invention, a separate reverse rotation detecting and blocking circuit (not illustrated) for preventing reverse rotation is not required and therefore the manufacturing cost for the hybrid induction motor is reduced. In addition, the reverse rotation can be prevented with only simple instrumental construction to thereby enhance reliability.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

What is claimed is:

1. A hybrid induction motor comprising:
    a housing;
    a stator provided in the housing and having a stator core portion and a stator coil portion;
    a rotor coupling body having a rotary shaft rotatably provided in the housing, a cage rotor portion configured to rotate integrally with the rotary shaft, and a permanent magnet rotor portion coupled to a circumference of the cage rotor portion with an air gap so as to rotate freely with respect to the rotary shaft; and
    a reverse rotation preventing switch configured to contact the permanent magnet rotor portion moving along the shaft by thrust generated by the rotor coupling body and to cut off power being supplied to the stator coil portion when the rotary shaft rotates in reverse.

2. The hybrid induction motor of claim 1, wherein the cage rotor portion comprises:
    a rotor core having a shaft hole into which the rotary shaft is received;
    a plurality of conductor bars penetrating the rotor core and provided in a position skewed with respect to the rotary shaft; and
    an end ring portion connecting end portions of the conductor bar to each other.

3. The hybrid induction motor of claim 1, wherein the permanent magnet rotor portion comprises:
    a bearing rotatably and movably coupled with the rotary shaft;
    a magnet support portion coupled integrally with the bearing; and
    a permanent magnet coupled to one side of the magnet support portion.

4. The hybrid induction motor of claim 1, wherein the reverse rotation preventing switch comprises:
    a body;
    an operation pin provided in the body and pressurized by the permanent magnet rotor portion when the rotary shaft rotates in reverse; and
    a spring to pressurize the operation pin to project the operation pin outside the body.

5. The hybrid induction motor of claim 2, wherein the conductor bar is inclined downwardly toward a first side from a second side to have a skew angle with respect to the rotary shaft and the reverse rotation preventing switch is positioned at the first side of the inside of the housing.

6. The hybrid induction motor of claim 5, further comprising:
    a stopper provided in the permanent magnet rotor portion.

7. The hybrid induction motor of claim 2, wherein the conductor bar is inclined downwardly toward a second side from a first side to have a skew angle with respect to the rotary shaft and the reverse rotation preventing switch is at the second side of the inside of the housing.

8. The hybrid induction motor of claim 7, further comprising:
a stopper provided outside of the permanent magnet rotor portion.

9. The hybrid induction motor of claim 2, wherein the end ring portion connects both end portions of the conductor bar to each other.

10. The hybrid induction motor of claim 5, wherein the conductor bar has a skew angle as much as $\ominus$.

11. The hybrid induction motor of claim 7, wherein the conductor bar has a skew angle as much as $\ominus$.

12. The hybrid induction motor of claim 3, wherein the cage rotor portion comprises:
a rotor core having a shaft hole into which the rotary shaft is received;
a plurality of conductor bars penetrating the rotor core and provided in a position skewed with respect to the rotary shaft; and
an end ring portion connecting end portions of the conductor bar to each other;
wherein the conductor bar is inclined downwardly toward a side of the cage rotor portion adjacent the magnet support portion to have a skew angle with respect to the rotary shaft and the reverse rotation preventing switch is positioned at the side of the cage rotor portion adjacent the magnet support portion of the inside of the housing.

13. The hybrid induction motor of claim 3, wherein the cage rotor portion comprises:
a rotor core having a shaft hole into which the rotary shaft is received;
a plurality of conductor bars penetrating the rotor core and provided in a position skewed with respect to the rotary shaft; and
an end ring portion connecting end portions of the conductor bar to each other;
wherein the conductor bar is inclined downwardly away from a side of the cage rotor portion adjacent the magnet support portion to have a skew angle with respect to the rotary shaft and the reverse rotation preventing switch is positioned at the side of the cage rotor portion opposite the magnet support portion of the inside of the housing.

* * * * *